Patented Jan. 2, 1923.

1,440,962

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCTS OBTAINED THEREBY.

No Drawing.      Application filed April 1, 1922.   Serial No. 548,826.

*To all whom it may concern:*

Be it known that I, SIDNEY M. CADWELL, a citizen of the United States, residing at Leonia, county of Bergen, and State of New Jersey, have invented certain new and useful Improvements in Processes for Vulcanizing Rubber and Products Obtained Thereby, of which the following is a full, clear, and exact description.

This invention relates to vulcanizing rubber and similar materials, and to the products obtained thereby, being more particularly directed to acceleration of vulcanization by a class of organic accelerators and products resulting from such vulcanization.

This case is a continuation in part of my co-pending applications Serial No. 359,808, filed February 19, 1920; Serial No. 379,492, filed May 7, 1920; Serial No. 417,581, filed October 18, 1920; Serial No. 374,275, filed April 16, 1920; Serial No. 424,456, filed November 16, 1920; Serial No. 455,490, filed March 25, 1921, and Serial No. 471,439, filed May 21, 1921. The following applications have been filed on the same date with this application as divisions thereof: Serial Nos. 548,827, 548,828, 548,829, 548,830 and 548,831.

One object of the invention is to provide a process of the kind mentioned employing accelerators obtainable from inexpensive raw materials by a simple method. Another object of the invention is to provide a process in which accelerators of the kind mentioned may be readily compounded with rubber, or similar material, which shall permit of the carrying out of vulcanization at ordinary temperatures, in masses of rubber or in thin sheets while avoiding the generation of acids during the process of vulcanization, as, for example, takes places when sulphur chloride is used. Another object is to provide a series of products having generally desirable physical characteristics, such as high tensile strength, resistance to aging, resistance to flexing, etc., and which shall be substantially free from the odor of the vulcanizing ingredients employed. Other objects will in part be obvious and in part pointed out hereinafter.

The invention accordingly consists broadly in the process, and product obtained therefrom, for treating rubber and similar materials, which comprises subjecting the rubber to a vulcanizing agent and a substance containing the radical $$\overset{RCSM,}{\underset{X}{\|}}$$

and vulcanizing the rubber. In this formula, R represents any element subject to the limitation mentioned hereinafter; M represents a salt-forming element or group or hydrogen, such as zinc, ammonium, etc., and is designated as representing a metal or being metallic, or a radical $$\overset{SCR}{\underset{X}{\|}}$$

or a radical $$\overset{CR;}{\underset{X}{\|}}$$

and X represents any bivalent element or radical, such as sulphur, oxygen, etc., subject to the limitation mentioned later.

It will be seen that the substances containing the radical fall into three groups corresponding to the three said significations of M. In the first two groups the symbol R in $$\overset{RCSM}{\underset{X}{\|}}$$

is preferably limited to any element except nitrogen; in the third group where M represents

this limitation is absent. In the table herein shown forming part of the specification, there is shown the broad group containing the radical

sub-divided into three smaller groups which are respectively

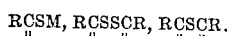

M=Metal, M=SCR, M=CR etc. 

It will be noted that the group formulæ represent generally derivatives of carbon oxysulphide or carbon disulphide.

The formulæ of the first two groups mentioned, in which the first symbol R is any element except nitrogen, may be written

under which fall

where M is the metal and thiol salts are included, and

where M is equal to

and the disulphides are represented. R' in these formulæ designates any element except nitrogen.

In employing the first group of those mentioned above including substances having the formula

it has been found that M preferably represents either zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state, so that the preferred formula for the thiol salts is

where M' represents one of the preferred metals given. M' may be substituted by any metal provided that one of the metals just mentioned is present in the combination either at some other position in the formula including

or be introduced otherwise than as part of this compound. In connection with the other groups mentioned, namely, those represented by the formulæ

and

constituting respectively the disulphide and monosulphide groups, the presence of zinc or mercury in the mercuric state is preferable when vulcanization at ordinary temperatures is carried out. When vulcanization above ordinary temperatures is carried out the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state. As noted in connection with the first group, the metals employed with groups 2 and 3 may be present in any combined form.

In the table mentioned above, R and X are shown as represented by carbon, oxygen, nitrogen and sulphur, which are four of the more important elements occurring in organic compounds.

It will be understood that the invention is not limited to the species shown in the accompanying table, and that by substituting other elements than nitrogen, carbon, oxygen and sulphur for the symbol R or X, various other species may be formulated falling within the scope of the invention.

Although the various species disclosed are represented as symmetrical, it will be understood that unsymmetrical species also fall within the limits of the invention.

The table is:—

1,440,962

|  | RCSM $\underset{X}{\parallel}$ |  |
|---|---|---|

Group I.
R'CSM $\underset{X}{\parallel}$
M Metal.
Thiol salts.

| 1. OCSM $\underset{S}{\parallel}$ | 2. OCSM $\underset{O}{\parallel}$ | 3. OCSM $\underset{NR}{\parallel}$ | 4. OCSM $\underset{CH_2}{\parallel}$ |
|---|---|---|---|
| 5. CCSM $\underset{S}{\parallel}$ | 6. CCSM $\underset{O}{\parallel}$ | 7. CCSM $\underset{NR}{\parallel}$ | 8. CCSM $\underset{CH_2}{\parallel}$ |
| 9. SCSM $\underset{S}{\parallel}$ | 10. SCSM $\underset{O}{\parallel}$ | 11. SCSM $\underset{NR}{\parallel}$ | 12. SCSM $\underset{CH_2}{\parallel}$ |
| 13. NCSM $\underset{S}{\parallel}$ | 14. NCSM $\underset{O}{\parallel}$ | 15. NCSM $\underset{NR}{\parallel}$ | 16. NCSM $\underset{CH_2}{\parallel}$ |

Group II.
R'CSSCR $\underset{X}{\parallel}\underset{X}{\parallel}$
M=SCR $\underset{X}{\parallel}$
Disulphides.

| 17. OCSSCO $\underset{S}{\parallel}\underset{S}{\parallel}$ | 18. OCSSCO $\underset{O}{\parallel}\underset{O}{\parallel}$ | 19. OCSSCO $\underset{NR}{\parallel}\underset{NR}{\parallel}$ | 20. OCSSCO $\underset{CH_2}{\parallel}\underset{CH_2}{\parallel}$ |
|---|---|---|---|
| 21. CCSSCC $\underset{S}{\parallel}\underset{S}{\parallel}$ | 22. CCSSCC $\underset{O}{\parallel}\underset{O}{\parallel}$ | 23. CCSSCC $\underset{NR}{\parallel}\underset{NR}{\parallel}$ | 24. CCSSCC $\underset{CH_2}{\parallel}\underset{CH_2}{\parallel}$ |
| 25. SCSSCS $\underset{S}{\parallel}\underset{S}{\parallel}$ | 26. SCSSCS $\underset{O}{\parallel}\underset{O}{\parallel}$ | 27. SCSSCS $\underset{NR}{\parallel}\underset{NR}{\parallel}$ | 28. SCSSCS $\underset{CH_2}{\parallel}\underset{CH_2}{\parallel}$ |
| 29. NCSSCN $\underset{S}{\parallel}\underset{S}{\parallel}$ | 30. NCSSCN $\underset{O}{\parallel}\underset{O}{\parallel}$ | 31. NCSSCN $\underset{NR}{\parallel}\underset{NR}{\parallel}$ | 32. NCSSCN $\underset{CH_2}{\parallel}\underset{CH_2}{\parallel}$ |

Group III.
RCSCR $\underset{X}{\parallel}\underset{X}{\parallel}$
M=CR $\underset{X}{\parallel}$
Monosulphides.

| 33. OCSCO $\underset{S}{\parallel}\underset{S}{\parallel}$ | 34. OCSCO $\underset{O}{\parallel}\underset{O}{\parallel}$ | 35. OCSCO $\underset{NR}{\parallel}\underset{NR}{\parallel}$ | 36. OCSCO $\underset{CH_2}{\parallel}\underset{CH_2}{\parallel}$ |
|---|---|---|---|
| 37. CCSCC $\underset{S}{\parallel}\underset{S}{\parallel}$ | 38. CCSCC $\underset{O}{\parallel}\underset{O}{\parallel}$ | 39. CCSCC $\underset{NR}{\parallel}\underset{NR}{\parallel}$ | 40. CCSCC $\underset{CH_2}{\parallel}\underset{CH_2}{\parallel}$ |
| 41. SCSCS $\underset{S}{\parallel}\underset{S}{\parallel}$ | 42. SCSCS $\underset{O}{\parallel}\underset{O}{\parallel}$ | 43. SCSCS $\underset{NR}{\parallel}\underset{NR}{\parallel}$ | 44. SCSCS $\underset{CH_2}{\parallel}\underset{CH_2}{\parallel}$ |
| 45. NCSCN $\underset{S}{\parallel}\underset{S}{\parallel}$ | 46. NCSCN $\underset{O}{\parallel}\underset{O}{\parallel}$ | 47. NCSCN $\underset{NR}{\parallel}\underset{NR}{\parallel}$ | 48. NCSCN $\underset{CH_2}{\parallel}\underset{CH_2}{\parallel}$ |

Group I.

M Metal
Thiol salts.

In general, it is to be noted in connection with this group, that its members are able to accelerate both hot vulcanization, that is, vulcanization at or above 240° F. and vulcanization below such temperatures, and that they may be used for such vulcanization in thick masses of rubber, in thin sheets, or in cements.

The general procedure for vulcanizing employing members of this group is as follows:—100 parts of rubber, 10 parts zinc oxide, 3 parts of sulphur, and 0.1–3.0 parts of accelerator are mixed. If vulcanization with heat is employed the usual temperatures or lower may be used for periods of thirty minutes or more to complete vulcanization. The normal or usual temperatures of hot vulcanization are 240° F. or above. If cold vulcanization is desired the mixed materials may be allowed to stand at ordinary room temperature for a week or less, when vulcanization is complete. The procedure given above may be employed with thin or thick masses of rubber, and in the case of cements where a solvent is used with the mixture, the procedure after mixing and evaporation of the solvent, is substantially identical with that employed for thin masses of rubber. The use of materials of this group, in the manner indicated above, will secure cold vulcanization without added bases or amines, but if such bases or amines are added, the vulcanization is accelerated.

The action of the addition of amines to materials of this class has been found to be as follows:—The acceleration by aliphatic amines is greatest when approximately a half molecular weight of the amine on the basis of the carbon disulphide content of the thiol salt is used. An excess of primary aliphatic amine retards the cure considerably. An excess of secondary aliphatic amine retards the cure less and an excess of tertiary aliphatic amine has practically no retarding effect. The greater the amount of primary aromatic amine added the greater the acceleration. Dibenzyl amine has given excellent results in the acceleration of vulcanization according to the invention. Aniline has also given good results. Bases such as sodium hydroxide also accelerate the action of thiol salts.

The thiol salts are particularly adapted to be used in connection with cold curing and cements. It will be understood of course as pointed out above that they may be used in hot vulcanization and otherwise as desired. The members of the group are preferably employed with substances containing combined zinc, preferably zinc oxide, or one of the metals in combination hereinbefore enumerated. The oxides are generally designated as M'O.

Species 1.

As a specfiic embodiment of one of the members of this group which when employed in a process constituting the invention has provided good results, the following example is cited:—100 parts of rubber, 10 parts of zinc oxide, 4 parts of zinc butyl xanthogenate, 1 part of sulphur, and two (2) parts paratoluidine, are mixed by milling in the usual way. The mixture is milled or sheeted or formed in any other way and the material so treated is allowed to stand for several days. Vulcanization is then completed at ordinary temperature without the application of heat. A convenient method for vulcanization at temperatures below 240° F. consists in exposing the above mixture, milled, sheeted, or formed in any other way desired, to a temperature of approximately 170° F. for 60 minutes, whereupon satisfactory vulcanization is secured. It will be observed that a base, paratoluidine, has been employed here. Such a base, particularly an amine accelerates the vulcanization process, employing the various members of this species, even more rapidly, although if omitted vulcanization will take place at ordinary temperatures. A convenient method for forming molded goods is to heat the rubber compounded with a member of this species for a short period in the mold, and then allow vulcanization to proceed at ordinary temperatures.

In employing material of this species with cement, the following procedure may be carried out:—100 parts of rubber, 10 parts zinc oxide, 6 parts of zinc butyl xanthogenate, are made into a cement with 800 parts of benzol, and 100 parts of rubber, 10 parts of zinc oxide, 6 parts of sulphur and 6 parts of paratoluidine are made into cement with 800 parts of benzol. Neither one of these cements will vulcanize at ordinary temperatures on standing for several months, but if mixed in equal proportions the mixed cement or the dried rubber therefrom will vulcanize in from 24 to 48 hours in ordinary room temperature. If high temperatures are employed vulcanization proceeds more quickly.

Zinc butyl xanthogenate is prepared as follows: 20 lbs. potassium hydroxide sticks are dissolved in a minimum amount of hot water. The solution is cooled and placed in a cool tub, and 6000 cc. carbon disulphide and 7000 cc. butyl alcohol are slowly added with stirring and cooling. Heat is evolved and the reaction mixture takes on a red color. It is cooled and filtered and the residue which is believed to be potassium butyl xanthogenate is recrystallized from a small amount of water. 200 grams of this potassium butyl xanthogenate are dissolved in a litre of water and added to 200 grams of zinc sulphate dissolved in a litre of water. The precipitate which forms is believed to be zinc butyl xanthogenate. It is filtered out and dried at ordinary temperature. The zinc butyl xanthogenate as thus prepared usually contains a small amount of zinc oxide, but it may be purified until only a small per cent zinc oxide remains. Among its properties may be mentioned the following: It decomposes in the presence of amines and alkalies. It is a white powder; it is soluble in about 10 parts benzol; soluble in about 8 parts chloroform, somewhat soluble in carbon tetrachloride; slightly soluble in gasoline or ligroin.

In general, members of this species operate advantageously where the zinc or similar combined metal is present. Where zinc oxide is used reduction in its proportions will produce transparent stocks.

Other members of this species falling under the general formula given are:—butyl xanthogenate of potassium, sodium, barium, magnesium, calcium, ammonium, iron, lead, etc.

Other members of this species are:—

Barium ethylxanthogenate $$C_2H_5OCSBaSCOC_2H_5$$
$$\underset{S}{\|} \quad \underset{S}{\|}$$

Sodium methylxanthogenate $$CH_3OCSNa$$
$$\underset{S}{\|}$$

Lead methylxanthogenate $$CH_3OCSPbSCOCH_3$$
$$\underset{S}{\|} \quad \underset{S}{\|}$$

Zinc methylaxanthogenate $$CH_3OCSZnSCOCH_3$$
$$\underset{S}{\|} \quad \underset{S}{\|}$$

Linthium ethylxanthogenate

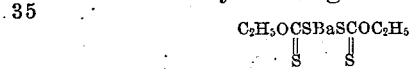

Magnesium ethylxanthogenate

Calcium ethylxanthogenate

Ammonium ethylxanthogenate

Potassium ethylxanthogenate

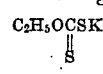

Sodium ethylxanthogenate

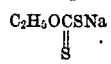

Ferric ethylxanthogenate

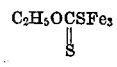

Lead ethylxanthogenate

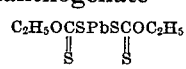

Mercuric ethylxanthogenate

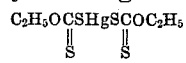

Potassium amylxanthogenate

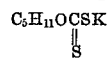

Zinc amylxanthogenate

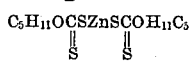

Zinc ethylxanthogenate

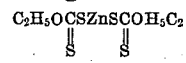

*Species 2.*

$$\underset{O}{\overset{OCSM}{\|}}$$

The following members of this species have been employed to give good results in connection with the process included in the invention:—

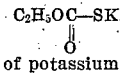
Ethyloxyester of potassium thiolcarbonate.

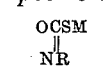
Butyloxyester of potassium thiolcarbonate.

*Species 3.*

$$\underset{NR}{\overset{OCSM}{\|}}$$

The following members of this species have been employed to give good results in connection with the process included in the invention.

Ethyl ester of allyl thiocarbamic acid

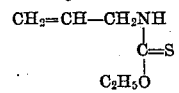

Ethyl ester of phenylthiocarbamic acid

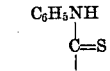

Butyl ester phenylthiocarbamic acid

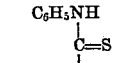

Species 5.

$$\underset{\underset{S}{\parallel}}{CCSM}$$

The following members of this species have been employed to give good results in connection with the process included in the invention:

Lead dithiophenylacetate $$C_6H_5CH_2\underset{\underset{S}{\parallel}}{C}-SPbS-\underset{\underset{S}{\parallel}}{C}CH_2C_6H_5$$

Lead dithiobenzoate $$C_6H_5\underset{\underset{S}{\parallel}}{C}-SPbS-\underset{\underset{S}{\parallel}}{C}C_6H_5$$

or

Zinc dithiobenzoate $$C_6H_5\underset{\underset{S}{\parallel}}{C}-SZnS-\underset{\underset{S}{\parallel}}{C}C_6H_5$$

or

Cadmium dithiobenzoate $$C_6H_5\underset{\underset{S}{\parallel}}{C}-SCdS-\underset{\underset{S}{\parallel}}{C}C_6H_5$$

or

Mercurous dithiobenzoate $$C_6H_5\underset{\underset{S}{\parallel}}{C}-SHg$$

or

Cupric dithiobenzoate $$C_6H_5\underset{\underset{S}{\parallel}}{C}-SCuS-\underset{\underset{S}{\parallel}}{C}C_6H_5$$

or

Potassium dithiobenzoate $$C_6H_5\underset{\underset{S}{\parallel}}{C}-SK$$

or

Lead dithioacetate $$CH_3\underset{\underset{S}{\parallel}}{C}-SPbS-\underset{\underset{S}{\parallel}}{C}CH_3$$

or

Lead dithiobrombenzoate $$BrC_6H_4\underset{\underset{S}{\parallel}}{C}-SPbS-\underset{\underset{S}{\parallel}}{C}C_6H_4Br$$

Zinc dithiobenzoate is preferably employed as follows: 100 parts of rubber are mixed with 10 parts of zinc oxide, 3 parts of sulphur and $\frac{1}{10}$ part of zinc dithiobenzoate, and vulcanization is accomplished in a mold at 40 lbs. steam pressure for 30 minutes.

Species 6.

$$\underset{\underset{O}{\parallel}}{CCSM}$$

The following members of this species have been employed to give good results in connection with the process included in the invention:—

Lead thiobenzoate $$C_6H_5\underset{\underset{O}{\parallel}}{C}-SPbS-\underset{\underset{O}{\parallel}}{C}C_6H_5$$

Potassium thioacetate $$CH_3\underset{\underset{O}{\parallel}}{C}SK$$

Lead thiobutrate $$C_3H_7\underset{\underset{O}{\parallel}}{C}-SPbS-\underset{\underset{O}{\parallel}}{C}C_3H_7$$

Species 7.

$$\underset{\underset{NR}{\parallel}}{CCSM}$$

The following members of this species have been employed to give good results in connection with the process included in the invention:—

$$\underset{\underset{S}{\parallel}}{C_6H_5CNH_2}$$

Thiobenzamide.

$$\underset{\underset{S}{\parallel}}{C_6H_5CNHC_6H_5}$$

Thiobenzanilide.

Species 9.

$$\underset{\underset{S}{\parallel}}{SCSM}$$

The following members of this species have been employed to give good results in connection with the process included in the invention:—

$$C_2S_7Co_2(NH_3)_6$$
Cobalto-ammonium trithiocarbonate.
K. A. Hofmann & Hochtlen Berichte 36, 1146 (1903).

$$CS_3CuNH_4$$
Cuproammonium trithiocarbonate (same ref.).

$$K_2CS_3$$
Potassium trithiocarbonate.

$$Ca(OH)_2CaCS_3$$
Basic calcium trithiocarbonate.

Species 10.

$$\underset{\underset{O}{\parallel}}{SCSM}$$

The following member of this species has been employed to give good results in connection with the process included in this invention:

$$ZnCOS_2$$
Zinc dithiocarbonate.

Species 13.

$$\underset{\underset{S}{\parallel}}{NCSM}$$

Disclosure of this species is made and claimed in copending application Serial No. 374,275, filed April 16, 1920.

The members of this class include:

Potassium orthomethylphenylenedithiocarbamate $$o\text{-}CH_3.C_6H_4.\underset{\underset{S}{\parallel}}{NH.C}-S-K$$

Ammonium para-aminophenylenedithiocarbamate $$p\text{-}NH_2C_6H_4NHC\text{--}SNH_4$$
$$\|$$
$$S$$

Ammonium phenylethyldithiocarbamate $$\begin{array}{c}C_6H_5\\C_2H_5\end{array}\!\!>\!\!N\text{--}C\text{--}SNH_4$$

Potassium para-aminophenylenedithiocarbamate $$p\text{-}NH_2C_6H_4NH\text{--}C\text{--}SK$$
$$\|$$
$$S$$

Zinc para-aminophenylenedithiocarbamate $$p\text{-}NH_2C_6H_4NHC\text{--}S\text{--}Zn\text{--}S\text{--}CNHC_6H_4NH_2\text{-}p$$

Zinc ethylphenyldithiocarbamate $$\begin{array}{c}C_6H_5\\C_2H_5\end{array}\!\!>\!\!NCSZnSCN\!\!<\!\!\begin{array}{c}C_6H_5\\C_2H_5\end{array}$$

Ammonium benzidyldithiocarbamate $$H_2NC_6H_4C_6H_4NHC\text{--}S\text{--}NH_4$$
$$\|$$
$$S$$

Ammonium phenyldithiocarbamate $$C_6H_5NHC\text{--}SNH_4$$
$$\|$$
$$S$$

Zinc phenylaminodithiocarbamate $$C_6H_5NHNHC\text{--}SZn\text{--}S\text{--}C\text{--}NHNHC_6H_5$$

Zinc alphanapthyldithiocarbamate $$a\text{-}C_{10}H_7NHC\text{--}S\text{--}Zn\text{--}S\text{--}CNHC_{10}H_7\text{-}a$$

Paramethylphenyleneammonium paramethylphenylenedithiocarbamate $$p\text{-}CH_3C_6H_4NHC\text{--}SH_3NC_6H_4CH_3\text{-}p$$
$$\|$$
$$S$$

Ammonium metamethylaminophenyldithiocarbamate $$\begin{array}{c}CH_3\\H_2N\end{array}\!\!>\!\!C_6H_3NHC\text{--}S\text{--}NH_4$$

Zinc metadiaminomethylphenyldithiocarbamate $$\begin{array}{c}NH_2\\CH_3\\NH_2\end{array}\!\!>\!\!C_6H_2NHC\text{--}SZn\text{--}S\text{--}CNH.H_2C_6\!\!<\!\!\begin{array}{c}NH_2\\CH_3\\NH_2\end{array}$$

Ammonium paranitrophenylenedithiocarbamate $$p\text{-}NO_2C_6H_4NHC\text{--}SNH_4$$
$$\|$$
$$S$$

Ammonium paramethylphenylenedithiocarbamate $$p\text{-}CH_3C_6H_4NHC\text{--}SNH_4$$
$$\|$$
$$S$$

Zinc paramethylphenylenedithiocarbamate $$p\text{-}CH_3C_6H_4NHC\text{--}SZnSCNHC_6H_4CH_3\text{-}p$$

Ammonium orthomethylphenylenedithiocarbamate $$o\text{-}CH_3C_6H_4NHC\text{--}SNH_4$$
$$\|$$
$$S$$

Zinc phenylethylthiocarbamate $$\begin{array}{c}C_6H_5\\C_2H_5\end{array}\!\!>\!\!N\text{--}C\text{--}S\text{--}Zn\text{--}S\text{--}C\text{--}N\!\!<\!\!\begin{array}{c}C_6H_5\\C_2H_5\end{array}$$

Zinc phenylmethyldithiocarbamate $$\begin{array}{c}C_6H_5\\CH_3\end{array}\!\!>\!\!NC\text{--}S\text{--}Zn\text{--}S\text{--}C\text{--}N\!\!<\!\!\begin{array}{c}C_6H_5\\CH_3\end{array}$$

Stannous paramethylphenylenedithiocarbamate $$p\text{-}CH_3C_6H_4NHC\text{--}SSn_2$$
$$\|$$
$$S$$

Iron phenyldithiocarbamate $$C_6H_5NHC\text{--}SFe_3$$
$$\|$$
$$S$$

Zinc phenyldithiocarbamate $$C_6H_5NHC\text{--}S\text{--}Zn_2$$
$$\|$$
$$S$$

Iron ethylphenyldithiocarbamate $$\begin{array}{c}C_6H_5\\C_2H_5\end{array}\!\!>\!\!NC\text{--}SFe_3$$

Barium ethylphenyldithiocarbamate $$\begin{array}{c}C_6H_5\\C_2H_5\end{array}\!\!>\!\!NC\text{--}SBa_2$$

Calcium ethylphenyldithiocarbamate $$\begin{array}{c}C_6H_5\\C_2H_5\end{array}\!\!>\!\!NC\text{--}S\text{--}Ca_2$$

Para-aminophenyleneammonium para-aminophenylenedithiocarbamate $$p\text{-}NH_2C_6H_4NHC\text{--}SH_3NC_6H_4NH_2\text{-}p$$
$$\|$$
$$S$$

Barium orthomethylphenylenedithiocarbamate $$(o)CH_3C_6H_4NHC\text{--}S\text{--}Ba_2\text{--}SCNHC_6H_4CH_3(o)$$

Zinc orthomethylphenylenedithiocarbamate $$(o)\text{-}CH_3C_6H_4NHC\text{--}S\text{--}ZnSCNHC_6H_4CH_3(o)$$

Ferric paramethylphenylenedithiocarbamate $$p.CH_3C_6H_4NHC\text{--}SFe_3$$
$$\|$$
$$S$$

Barium paramethylphenylenedithiocarbamate $$p.CH_3C_6H_4NHC\text{--}S\text{--}Ba_2$$
$$\|$$
$$S$$

Calcium paramethylphenylenedithiocarbamate

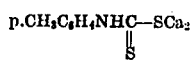

Magnesium orthomethylphenylenedithiocarbamate

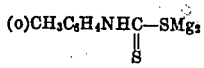

Copper ethylphenyldithiocarbamate

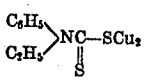

Zinc methylphenyldithiocarbamate

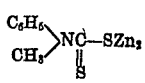

*Species 14.*

The following member of this species has been employed to give good results in connection with the process included in this invention:—

Zinc diethylthiocarbamate

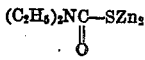

*Species 15.*

The following members of this species have been employed to give good results in connection with the process included in this invention:—

Ethylphenylthiourea

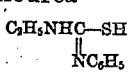

Dimethylphenylthiourea

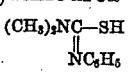

GROUP II.

Disulphides.

In general, members of this group exhibit similar properties to those set forth in connection with Group I. The procedure followed for vulcanization employing members of this group and the quantities of the ingredients in general are the same as are employed in Group I. In connection with curing at ordinary temperatures, it is pointed out that such curing is effected in a slightly longer time than in connection with members of Group I. The group possesses the advantage that its members may be introduced into bulk rubber with practically no danger of prevulcanization or burning when milled. As pointed out above, a combined metal preferably in the form of a metallic oxide such as zinc oxide, is employed in connection with members of this group. In general, the use of bases, particularly amines, is preferred in connection with members of this group.

The action of the addition of primary and secondary amines to materials of this class has been found to be as follows:— The acceleration by aliphatic amines is greatest when approximately three-quarters molecular weight of the amine on the basis of the carbon disulphide content of the compound is used. An excess of primary aliphatic amine retards the cure considerably. An excess of secondary aliphatic amine retards the cure less. The greater the amount of primary aromatic amine added, the greater the acceleration. Tertiary amines have substantially no effect. Dibenyl amine has given excellent results in the acceleration of vulcanization according to the invention. Aniline has also given good results. Sodium hydroxide also accelerates the action of disulphides.

*Species 17.*

As an example of the specific procedure employing a member of this group, 100 parts of rubber, 10 parts of zinc oxide, 3 parts of sulphur and two parts O-normal butyl thiocarbonic acid disulphide, are mixed by milling and vulcanization is accomplished by placing the material in a mold and subjecting to steam pressure at 40 pounds per square inch for 10 minutes.

The cure may be continued several times as long without bad effects and the vulcanization may be carried out in open air or steam with equally good results. The time of cure is of course dependent on the thickness of the rubber and will vary with different kinds of stock. This accelerator is however particularly active and vulcanization is quickly obtained and a stock produced which has excellent tensile properties and very little odor.

The oxy normal butyl thiocarbonic acid disulphide is prepared by adding one gram molecular weight of butyl alcohol, and one gram molecular weight of carbon disulphide, to a solution of two gram molecular weights of potassium hydroxide, dissolved to form a 50% aqueous solution, and constantly stirring the mixture and cooling. Needles of potassium butyl xanthogenate separate out and can be recrystallized from water or alcohol. This salt is dissolved in water and oxidized by the addition of aqueous iodine. A heavy oil separates out which after removal of iodine with sodium thiosulphate solution is separated from the water and filtered in order to purify it, thereby obtaining a clear light reddish brown oil having very little odor. Other members of this class may be similarly prepared but it is pointed out that the claims are not limited to the herein described method of preparation since these accelerators may be otherwise prepared and it is intended in the claims to cover processes of vulcanization employing accelerators having constitutions similar or identical with those prepared by the above described method.

Vulcanization at a low temperature, 100 parts of rubber, 10 parts of zinc oxide, 1 part of sulphur, 5 parts of O-normal butyl thiocarbonic acid disulphide, and 1 part of aniline are mixed by milling and allowed to remain at ordinary room temperature for a week approximately, whereupon a satisfactory vulcanization is effected.

By varying the accelerator and the amine various results may be produced and the temperatures necessary for vulcanization may be likewise varied. In the case of some of the accelerators of this class, low temperature vulcanization may be accomplished without the aid of an amine. It will be apparent that when low temperature vulcanization is carried out with the aid of the several members of the class, the proportions of the example just given may be varied to suit the requirements of the particular case and the stock to be treated. By the term low temperature is meant temperatures ranging from room temperature or lower to nearly 240° F.

The above accelerator is a preferred member of a group of compounds which are able to produce approximately equally good results when added as accelerators in vulcanizing rubber and among the members of this group may be mentioned the following:

O-methylthiocarbonic acid disulphide

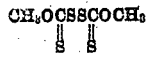

O-ethylthiocarbonic acid disulphide

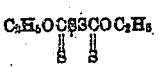

O-amylthiocarbonic acid disulphide

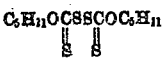

Other thiocarbonic acid disulphides containing other alkyl or equivalent groups will also accelerate vulcanization in a similar manner, but these accelerators will naturally vary in their effects according to the nature of the alkyl or similar group, and they may be selected for the requirements of a particular case.

By the use of the above mentioned accelerators vulcanization is accomplished in a rapid and efficient manner without burning or prevulcanization on the mill and rubber products are produced having high tensile strength, good aging qualities and very little odor. The fact that many of the members of the above group are oily substances renders their addition to the compounding ingredients on the mill an easy operation and results in a very uniform and efficient mixture. The raw materials from which the accelerators are prepared are moreover cheap and the process of manufacture simple. It is therefore evident that the objects of the invention above enumerated have been achieved.

A particular merit of these accelerators is that they will effect cold vulcanization, and that they will do so without regenerating an acid, which is an advantage not possessed by sulphur chloride, for this agent generates HCl. They may be added directly to the compounding ingredients on the mill, which is also impracticable with sulphur chloride.

In general the members of this species are oils and hence may be more readily compounded than solid materials by milling.

*Species 18.*

The following member of this species has been employed to give good results in connection with the process included in the invention:

Dibutyloxyester of carbonyldisulphide

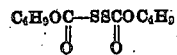

*Species 21.*

The following members of this species have been employed to give good results in connection with the process included in the invention:—

Thiobenzoyldisulphide

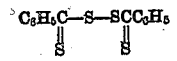

Thiophenylacetyldisulphide

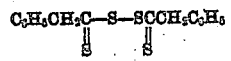

Thioacetyldisulphide

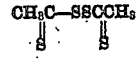

It will be observed that members of this species are capable of rapid acceleration when employed in such small quantities as 0.1 part to 100 parts of rubber. Thiobenzoyldisulphide will provide a vulcanized rubber having a sweet odor.

Species 22.

$$\underset{O\ \ O}{\overset{\|\ \ \|}{CCSSCC}}$$

The following members of this species have been employed to give good results in connection with the process included in the invention:—

Acetyldisulphide $$\underset{O\ \ \ O}{\overset{\|\ \ \ \|}{CH_3C-SSCCH_3}}$$

Benzoyldisulphide $$\underset{O\ \ \ O}{\overset{\|\ \ \ \|}{C_6H_5C-S-SCC_6H_5}}$$

Species 25.

$$\underset{S\ \ S}{\overset{\|\ \ \|}{SCSSCS}}$$

The following member of this species has been employed to give good results in connection with the process included in the invention:

Dibutylthiolester of thioncarbonyldisulphide $$\underset{S\ \ \ S}{\overset{\|\ \ \ \|}{C_4H_9SC-SSCSC_4H_9}}$$

Species 29.

$$\underset{S\ \ S}{\overset{\|\ \ \|}{NCSSCN}}$$

Members of this class include:

Dimethyldiphenylthiuramdisulphide $$\underset{C_6H_5}{\overset{CH_3}{>}}\!\!N\underset{S}{\overset{\|}{C}}\!-S-S-\underset{S}{\overset{\|}{C}}\!-N\underset{C_6H_5}{\overset{CH_3}{<}}$$

Diethyldiphenylthiuramdisulphide $$\underset{C_6H_5}{\overset{C_2H_5}{>}}\!\!N-\underset{S}{\overset{\|}{C}}\!-S-S-\underset{S}{\overset{\|}{C}}\!N\underset{C_6H_5}{\overset{C_2H_5}{<}}$$

Diparamethylphenylenedimethylthiuramdisulphide $$\underset{CH_3}{\overset{p.CH_3-C_6H_4}{>}}\!\!N\underset{S}{\overset{\|}{C}}\!-S-S-\underset{S}{\overset{\|}{C}}\!-N\underset{CH_3}{\overset{C_6H_4CH_3p.}{<}}$$

The above members were disclosed and claimed in my copending application Serial No. 374,275, filed April 16, 1920, and now appear in my copending application Serial No. 424,456, filed November 16, 1920.

Species 30.

$$\underset{O\ \ O}{\overset{\|\ \ \|}{NCSSCN}}$$

The following member of this species has been employed to give good results in connection with the process included in the invention:—

Tetraethylcarbamyldisulphide $$\underset{O\ \ \ \ O}{\overset{\|\ \ \ \ \|}{(C_2H_5)_2NC-SSCN(C_2H_5)_2}}$$

Group III.

$$\overset{RCSCR}{\underset{X}{\overset{\underset{M-CR}{\|}}{\underset{X\ \ X}{\|\ \ \|}}}}$$

Monosulphides.

In general, the members of this group are similar in their action in the process constituting this invention to the members of Groups I and II, except that the members of this group are particularly adapted for accelerating hot vulcanization rather than cold vulcanization. As accelerators of cold vulcanization they are somewhat limited. They show practically no tendency to cause prevulcanization or "burning" by milling.

The invention employing this group in its preferred embodiment consists in compounding 100 parts rubber, 10 parts zinc oxide, 3 parts sulphur and $\frac{1}{10}$ part of diphenyldinethylthiurammonosulphide, mixing being effected on the mills in the usual way and the product being cured in the mold under 40 lbs. steam pressure for ten minutes. Vulcanization may be effected in open steam or air with approximately similar results and the time of vulcanization may be prolonged without damage to the stock although of course the time of vulcanization will be dependent on the thickness of the goods. The resulting product is odorless and colorless and has the usual excellent properties of rubber cured with sulphur.

The action of the addition of primary and secondary amines to materials of this class has been found to be as follows: The acceleration by aliphatic amines is greatest when approximately one and one-half times the molecular weight of the amine on the basis of the molecular weight of the compound is used. An excess of primary aliphatic amine retards the cure considerably. An excess of secondary aliphatic amine retards the cure less. The greater the amount of primary aromatic amine added, the greater the acceleration. Tertiary amines have substantially no effect. Dibenzyl amine has given excellent results in the acceleration of vulcanization according to the invention. Sodium hydroxide also accelerates the action of monosulphides.

Species 38.

$$\underset{O\ \ O}{\overset{\|\ \ \|}{CCSCC}}$$

The following member of this species has been employed to give good results in connection with the process included in the invention:—

Thiobenzoic anhydride $$\underset{O\ \ \ O}{\overset{\|\ \ \ \|}{C_6H_5C-SCC_6H_5}}$$

also unsymmetrical compounds occupying midway position between Species 37 and 38:—

Benzoylbutylxanthogenate

Benzoyl ethylxanthogenate

*Species 45.*

Members of this class include:

D i p h e nyldimethylthiurammonosulphide (mentioned above.)

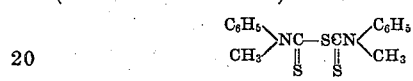

Tetramethylthiurammonosulphide

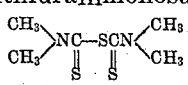

Tetraethylthiurammonosulphide

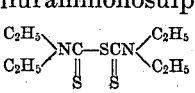

Diphenyldiethylthiurammonosulphide

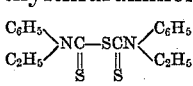

Tetrapropylthiurammonosulphide

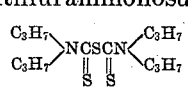

E t h y l p h e nyldimethylthiurammonosulphide

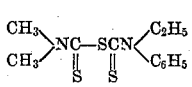

Methylphenylethylthiurammonosulphide

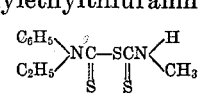

Phenylmethylcarbamylester of phenylmethyldithiocarbamicacid

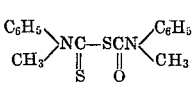

N-piperidyl-S-benzoyldithiourethane

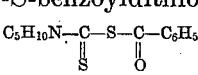

In general, the accelerators included in the three groups herein set forth are obtainable from inexpensive raw materials by simple methods. The members of Group III may be used, in general, safely without great danger of prevulcanization in the milling process. The members of the various groups may be employed generally for vulvanization in thick or thin masses of rubber or in cements.

It is to be understood that rubber substitutes, synthetic rubber, balata, gutta percha, etc., may be similarly treated instead of rubber and it is intended to cover such processes in the claims.

It will be noted in connection with the various members of Group I that the ability to accelerate vulcanization at temperatures below normal hot vulcanization temperature for instance at ordinary temperatures varies in accordance with the species selected, but in general, this group as has been pointed out, effects vulcanization at ordinary temperatures. Groups II and III also include species which accelerate vulcanization at ordinary temperatures, only slightly. In general the various experiments made in connection with the three groups indicate that nonnitrogenous accelerators effect vulcanization at ordinary temperatures. The products obtained in the various groups provide, in general, desirable physical characteristics, such as high tensile strength, resistance to aging, resistance to flexing, etc., and in general are free from the odor of vulcanizing ingredients. It will thus be seen that among others the objects of the invention above enumerated are achieved.

It will be understood that the invention disclosed in co-pending application Serial No. 441,691, filed February 1, 1921, may be employed in connection with the accelerators disclosed and included in the invention of the present application.

As many apparently widely different embodiments of this invention may be made without departing from the spirit thereof, it will be understood that I do not intend to limit myself to the specific embodiment herein set forth except as indicated in the appended claims.

Each of the substances enumerated herein as members of the various species has been employed in the vulcanization of rubber and has been found to accomplish vulcanization as indicated.

Having thus described my invention, what I claim and desire to protect by Letters Patent is:

1. A process of vulcanizing rubber or similar material which comprises combining with the rubber a vulcanizing agent, and an accelerator comprising the group $$\underset{X}{\overset{\text{RCSM,}}{\|}}$$

and vulcanizing the rubber.

2. A process of vulcanizing rubber or similar material which comprises combining with the rubber a vulcanizing agent, and an accelerator comprising the group $$\underset{X}{\overset{\text{RCSM}}{\|}}$$

in the presence of a combined metal M', and vulcanizing the rubber.

3. A process of vulcanizing rubber or similar material which comprises combining with the rubber a vulcanizing agent, a base, and an accelerator comprising the group $$\underset{\underset{X}{\parallel}}{RCSM,}$$

and vulcanizing the rubber.

4. A process of vulcanizing rubber or similar material which comprises combining with the rubber a vulcanizing agent, a base, and an accelerator comprising the group $$\underset{\underset{X}{\parallel}}{RCSM,}$$

in the presence of a combined metal M', and vulcanizing the rubber.

5. A process of vulcanizing rubber or similar material which comprises combining with the rubber a vulcanizing agent, an amine, and an accelerator comprising the group $$\underset{\underset{X}{\parallel}}{RCSM,}$$

and vulcanizing the rubber.

6. A process of vulcanizing rubber or similar material which comprises combining with the rubber a vulcanizing agent, an amine, and an accelerator comprising the group $$\underset{\underset{X}{\parallel}}{RCSM,}$$

in the presence of a combined metal M', and vulcanizing the rubber.

7. A process of vulcanizing rubber or similar material which comprises combining with the rubber a vulcanizing agent, and an accelerator comprising the group $$\underset{\underset{X}{\parallel}}{OCSM,}$$

and vulcanizing the rubber.

8. A process of vulcanizing rubber or similar material which comprises combining with the rubber a vulcanizing agent, and an accelerator comprising the group $$\underset{\underset{X}{\parallel}}{OCSM}$$

in the presence of a combined metal M', and vulcanizing the rubber.

9. A process of vulcanizing rubber or similar material which comprises combining with the rubber a vulcanizing agent $M'_xO_y$, and an accelerator comprising the group $$\underset{\underset{X}{\parallel}}{OCSM,}$$

and vulcanizing the rubber.

10. A process of vulcanizing rubber or similar material which comprises combining with the rubber a vulcanizing agent, and an accelerator comprising the group $$\underset{\underset{X\ X}{\parallel\ \parallel}}{R'CSSCR,}$$

and vulcanizing the rubber.

11. A process of vulcanizing rubber or similar material which comprises combining with the rubber a vulcanizing agent, and an accelerator comprising the radical $$\underset{\underset{S\ S}{\parallel\ \parallel}}{OCSSCO,}$$

and vulcanizing the rubber.

12. A process of vulcanizing rubber or similar material which comprises combining with the rubber a vulcanizing agent, and an accelerator comprising the radical $$\underset{\underset{S\ S}{\parallel\ \parallel}}{OCSSCO}$$

in the presence of a combined metal M', and vulcanizing the rubber.

13. A process of vulcanizing rubber or similar material which comprises combining with the rubber a vulcanizing agent and an accelerator comprising the radical $$\underset{\underset{S\ S}{\parallel\ \parallel}}{OCSSCO}$$

in the presence of M'O, and vulcanizing the rubber.

14. A process of vulcanizing rubber or similar material which comprises combining the rubber with a vulcanizing agent and an accelerator comprising the radical $$\underset{\underset{S\ S}{\parallel\ \parallel}}{OCSSCO}$$

and an amine, and vulcanizing the rubber.

15. A process of vulcanizing rubber or similar material which comprises combining the rubber with a vulcanizing agent and an accelerator comprising the radical $$\underset{\underset{S\ S}{\parallel\ \parallel}}{OCSSCO}$$

and an amine, in the presence of a combined metal M', and vulcanizing the rubber.

16. A process of vulcanizing rubber or similar material which comprises combining with rubber a vulcanizing agent and an accelerator comprising the radical $$\underset{\underset{S\ S}{\parallel\ \parallel}}{OCSSCO}$$

in the presence of combined zinc, and vulcanizing the rubber.

17. A process of vulcanizing rubber or similar material which comprises combining the rubber with a vulcanizing agent and an accelerator comprising the radical $$\underset{\underset{S\ S}{\parallel\ \parallel}}{OCSSCO}$$

and an amine, in the presence of combined zinc, and vulcanizing the rubber.

18. A process of vulcanizing rubber or similar material which comprises combining the rubber with a vulcanizing agent and an accelerator comprising the radical $$\text{OCSSCO} \atop \text{S S}$$

and an aromatic amine, in the presence of combined zinc, and vulcanizing the rubber.

19. A process of vulcanizing rubber or similar material which comprises combining the rubber with a vulcanizing agent and an accelerator comprising the radical $$\text{OCSSCO} \atop \text{S S}$$

and an aromatic amine, in the presence of zinc oxide, and vulcanizing the rubber.

20. A process of vulcanizing rubber or similar material which comprises combining with the rubber an organic disulphide in the presence of an amine and a combined metal M', and vulcanizing the rubber.

21. A process of vulcanizing rubber or similar material which comprises combining with the rubber an organic disulphide in the presence of an amine and combined zinc, and vulcanizing the rubber.

22. A process of vulcanizing rubber or similar material which comprises combining with the rubber a vulcanizing agent, a base and an accelerator comprising the group $$\text{RCSM} \atop \text{X}$$

in the presence of a combined metal M', and vulcanizing the rubber at a temperature below the normal hot vulcanizing temperature.

23. A process of vulcanizing rubber or similar material which comprises combining with the rubber a vulcanizing agent, an amine and an accelerator comprising the group $$\text{RCSM'} \atop \text{X}$$

in the presence of a combined metal M', and vulcanizing the rubber at a temperature below the normal hot vulcanizing temperature.

24. A process of vulcanizing rubber or similar material which comprises combining with the rubber a vulcanizing agent and an accelerator comprising the group $$\text{OCSM} \atop \text{X}$$

in the presence of a combined metal M', and vulcanizing the rubber at a temperature below the normal hot vulcanizing temperature.

25. A process of vulcanizing rubber or similar material which comprises combining with the rubber a vulcanizing agent, $M'_xO_y$, and an eccelerator comprising the group $$\text{OCSM,} \atop \text{X}$$

and vulcanizing the rubber at a temperature below the normal hot vulcanizing temperature.

26. A process of vulcanizing rubber or similar material which comprises combining the rubber with a vulcanizing agent and an accelerator comprising the radical $$\text{OCSSCO} \atop \text{S S}$$

and an amine, in the presence of a combined metal M', and vulcanizing the rubber at a temperature below the normal hot vulcanizing temperature.

27. A process of vulcanizing rubber or similar material which comprises combining the rubber with a vulcanizing agent and an accelerator comprising the radical $$\text{OCSSCO} \atop \text{S S}$$

and an aromatic amine, in the presence of combined zinc, and vulcanizing the rubber at a temperature below the normal hot vulcanizing temperature.

28. A process of vulcanizing rubber or similar material which comprises combining the rubber with a vulcanizing agent and an accelerator comprising the radical $$\text{OCSSCO} \atop \text{S S}$$

and an aromatic amine, in the presence of zinc oxide, and vulcanizing the rubber at a temperature below the normal hot vulcanizing temperature.

29. A process of vulcanizing rubber or similar material which comprises combining with the rubber an organic disulphide in the presence of an amine and a combined metal M', and vulcanizing the rubber at a temperature below the normal hot vulcanizing temperature.

30. A process of vulcanizing rubber or similar material which comprises combining with the rubber an organic disulphide in the presence of an amine and combined zinc, and vulcanizing the rubber at a temperature below the normal hot vulcanizing temperature.

31. A process of treating rubber or similar material which comprises combining it with a vulcanizing agent, a thiocarbonic acid disulphide and a combined metal M', and vulcanizing the rubber.

32. A process of treating rubber or similar material which comprises combining it with a vulcanizing agent, a thiocarbonic acid disulphide, a combined metal M' and an amine having a replaceable ammoniacal hydrogen, and vulcanizing the rubber.

33. A process of treating rubber or similar material which comprises combining it with a vulcanizing agent, an alkylated thiocarbonic acid disulphide, a combined metal M' and an amine having a replaceable ammoniacal hydrogen, and vulcanizing the rubber.

34. A process of treating rubber or similar material which comprises combining it with a vulcanizing agent, oxy normal butyl thiocarbonic acid disulphide, zinc in combination and an amine having a replaceable ammoniacal hydrogen, and vulcanizing the rubber.

35. A process of treating rubber or similar material which comprises combining it with a vulcanizing agent, oxy normal butyl thiocarbonic acid disulphide, zinc in combination, and an aliphatic amine having a replaceable ammoniacal hydrogen, and vulcanizing the rubber.

36. A process of treating rubber or similar material which comprises combining it with a vulcanizing agent, oxy normal butyl thiocarbonic acid disulphide, zinc oxide and dibenzyl amine, and vulcanizing the rubber.

37. A process of vulcanizing rubber or similar material which comprises treating the rubber with a non-nitrogenous carbon disulphide derivative in the presence of a vulcanizing agent and a combined metal M', and vulcanizing the rubber at a temperature below the normal hot vulcanization temperature.

38. A process of vulcanizing rubber or similar material which comprises treating rubber with a non-nitrogenous carbon oxy sulphide derivative and a metal M', and vulcanizing the rubber.

39. A process of vulcanizing rubber or similar material which comprises treating the rubber with a non-nitrogenous carbon disulphide derivative in the presence of sulphur, and a combined metal M', and vulcanizing the rubber at a temperature below the normal hot vulcanization temperature.

40. A process of vulcanizing rubber or similar material which comprises treating the rubber with a non-nitrogenous carbon oxy sulphide derivative in the presence of sulphur and a metal M', and vulcanizing the rubber.

41. A vulcanized rubber derived from rubber or similar material combined with an accelerator comprising the group $$\underset{X}{\overset{\parallel}{RCSM,}}$$

and a vulcanizing agent.

42. A vulcanized rubber derived from rubber or similar material combined with an accelerator comprising the group $$\underset{X}{\overset{\parallel}{RCSM}}$$

in the presence of a combined metal M', and a vulcanizing agent.

43. A vulcanized rubber derived from rubber or similar material combined with a base, and an accelerator comprising the group $$\underset{X}{\overset{\parallel}{RCSM,}}$$

and a vulcanizing agent.

44. A vulcanized rubber derived from rubber or similar material combined with a base and an accelerator comprising the group $$\underset{X}{\overset{\parallel}{RCSM,}}$$

in the presence of a combined metal M', and a vulcanizing agent.

45. A vulcanized rubber derived from rubber or similar material combined with an amine, and an accelerator comprising the group $$\underset{X}{\overset{\parallel}{RCSM,}}$$

and a vulcanizing agent.

46. A vulcanized rubber derived from rubber or similar material combined with a vulcanizing agent, an amine and an accelerator comprising the group.

$$\underset{X}{\overset{\parallel}{RCSM,}}$$

in the presence of a combined metal M'.

47. A vulcanized rubber derived from rubber or similar material combined with a vulcanizing agent and an accelerator comprising the group $$\underset{X}{\overset{\parallel}{OCSM.}}$$

48. A vulcanized rubber derived from rubber or similar material combined with a vulcanizing agent and an accelerator comprising the group $$\underset{X}{\overset{\parallel}{OCSM}}$$

in the presence of a combined metal M'.

49. A vulcanized rubber derived from rubber or similar material combined with a vulcanizing agent, $M'_xO_y$, and an accelerator comprising the group $$\underset{X}{\overset{\parallel}{OCSM.}}$$

50. A vulcanized rubber derived from rubber or similar material combined with a vulcanizing agent and an accelerator comprising the group $$\underset{X\ X}{\overset{\parallel\ \parallel}{R'CSSCR.}}$$

51. A vulcanized rubber derived from rubber or similar material combined with a vulcanizing agent and an accelerator comprising the radical $$\underset{S\ S}{\overset{\parallel\ \parallel}{OCSSCO.}}$$

52. A vulcanized rubber derived from rubber or similar material combined with a vulcanizing agent and an accelerator comprising the radical

in the presence of a combined metal M'.

53. A vulcanized rubber derived from rubber or similar material combined with a vulcanizing agent and an accelerator comprising the radical

in the presence of M'O.

54. A vulcanized rubber derived from rubber or similar material combined with a vulcanizing agent and an accelerator comprising the radical

and an amine.

55. A vulcanized rubber derived from rubber or similar material combined with a vulcanizing agent and an accelerator comprising the radical

and an amine, in the presence of a combined metal M'.

56. A vulcanized rubber derived from rubber or similar material combined with a vulcanizing agent and an accelerator comprising the radical

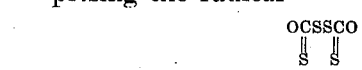

in the presence of combined zinc.

57. A vulcanized rubber derived from rubber or similar material combined with a vulcanizing agent and an accelerator comprising the radical

and an amine, in the presence of combined zinc.

58. A vulcanized rubber derived from rubber or similar material combined with a vulcanizing agent and an accelerator comprising the radical

and an aromatic amine, in the presence of combined zinc.

59. A vulcanized rubber derived from rubber or similar material combined with a vulcanizing agent and an accelerator comprising the radical

and an aromatic amine, in the presence of zinc oxide.

60. A vulcanized rubber derived from rubber or similar material combined with an organic disulphide in the presence of an amine and a combined metal M'.

61. A vulcanized rubber derived from rubber or similar material combined with an organic disulphide in the presence of an amine and combined zinc.

62. A rubber vulcanized at a temperature below the normal hot vulcanizing temperature derived from rubber or similar material combined with a vulcanizing agent, a base and an accelerator comprising the group

in the presence of a combined metal M'.

63. A rubber vulcanized at a temperature below the normal hot vulcanizing temperature derived from rubber or similar material combined with a vulcanizing agent, an amine and an accelerator comprising the group

in the presence of a combined metal M'.

64. A rubber vulcanized at a temperature below the normal hot vulcanizing temperature derived from rubber or similar material combined with a vulcanizing agent, and an accelerator comprising the group

in the presence of a combined metal M'.

65. A rubber vulcanized at a temperature below the normal hot vulcanizing temperature derived from rubber or similar material combined with a vulcanizing agent, $M'_xO_y$, and an accelerator comprising the group

66. A rubber vulcanized at a temperature below the normal hot vulcanizing temperature derived from rubber or similar material combined with a vulcanizing agent and an accelerator comprising the radical

and an amine, in the presence of a combined metal M'.

67. A rubber vulcanized at a temperature below the normal hot vulcanizing temperature derived from rubber or similar material combined with a vulcanizing agent and an accelerator comprising the radical

and an aromatic amine in the presence of combined zinc.

68. A rubber vulcanized at a temperature below the normal hot vulcanizing temperature derived from rubber or similar material combined with a vulcanizing agent and an accelerator comprising the radical

and an aromatic amine, in the presence of zinc oxide.

69. A rubber vulcanized at a temperature below the normal hot vulcanizing temperature derived from rubber or similar material combined with an organic disulphide in the presence of an amine and a combined metal M'.

70. A rubber vulcanized at a temperature below the normal hot vulcanizing temperature derived from rubber or similar material combined with an organic disulphide in the presence of an amine and combined zinc.

71. A vulcanized rubber derived from rubber or similar material combined with a vulcanizing agent, a thiocarbonic acid disulphide and a combined metal M'.

72. A vulcanized rubber derived from rubber or similar material combined with a vulcanizing agent, a thiocarbonic acid disulphide, a combined metal M' and an amine having a replaceable ammoniacal hydrogen.

73. A vulcanized rubber derived from rubber or similar material combined with a vulcanizing agent, an alkylated thiocarbonic acid disulphide, a combined metal M' and an amine having a replaceable ammoniacal hydrogen.

74. A vulcanized rubber derived from rubber or similar material combined with a vulcanizing agent, oxy normal butyl thiocarbonic acid disulphide, zinc in combination and an amine having a replaceable ammoniacal hydrogen.

75. A vulcanized rubber derived from rubber or similar material combined with a vulcanizing agent, oxy normal butyl thiocarbonic acid disulphide, zinc in combination, and an aliphatic amine having a replaceable ammoniacal hydrogen.

76. A vulcanized rubber derived from rubber or similar material combined with a vulcanizing agent, oxy normal butyl thiocarbonic acid disulphide, zinc oxide and dibenzyl amine.

77. A vulcanized rubber derived from rubber or similar material treated with a non-nitrogenous carbon disulphide derivative in the presence of a vulcanizing agent and a combined metal M' at a temperature below the normal hot vulcanization temperature.

78. A vulcanized rubber derived from rubber or similar material treated with a non-nitrogenous carbon oxy sulphide derivative and a metal M'.

79. A vulcanized rubber derived from rubber or similar material treated with a non-nitrogenous carbon disulphide derivative in the presence of sulphur, and a combined metal M' at a temperature below the normal hot vulcanization temperature.

80. A vulcanized rubber derived from rubber or similar material treated with a non-nitrogenous carbon oxy sulphide derivative in the presence of sulphur and a metal M'.

81. A process of vulcanizing rubber or similar material which comprises combining with the rubber a vulcanizing agent and an accelerator comprising the group

in the presence of a combined metal M', and vulcanizing the rubber at approximately 70° F.

82. A process of vulcanizing rubber or similar material which comprises combining with the rubber a vulcanizing agent and an accelerator comprising the radical

in the presence of a combined metal M', and vulcanizing the rubber at a temperature of approximately 70° F.

83. A process of vulcanizing rubber or similar material which comprises combining with the rubber a vulcanizing agent, oxy normal butyl thiocarbonic acid disulphide, zinc in combination, and vulcanizing the rubber at a temperature of 70° F. approximately.

84. A rubber vulcanized at 70° F. approximately derived from rubber or similar material combined with a vulcanizing agent and an accelerator comprising the group

in the presence of a combined metal M'.

85. A rubber vulcanized at a temperature of approximately 70° F. derived from rubber or similar material combined with a vulcanizing agent and an accelerator comprising the radical

in the presence of a combined metal M'.

86. A rubber vulcanized at a temperature of 70° F. approximately derived from rubber or similar material combined with a vulcanizing agent, oxy normal butyl thiocarbonic acid disulphide, zinc in combination.

87. A process for treating rubber or similar material which comprises combining it with sulphur, oxy normal butyl thiocarbonic acid disulphide and zinc in combination, and vulcanizing the rubber.

88. A vulcanized rubber derived from rubber or similar material combined with sulphur, oxy normal butyl thiocarbonic acid disulphide and zinc in combination.

Signed at New York, New York, this 30th day of March, 1922.

SIDNEY M. CADWELL.

Certificate of Correction.

Patent No. 1,440,962. — Granted January 2, 1923, to
SIDNEY M. CADWELL.

It is hereby certified that error appears in the printed specification of the above-numbered patent requiring correction as follows: Page 5, line 46, for the word "methylaxanthogenate" read *methylxanthogenate*, and line 50 for the word "Linthium" read *Lithium;* page 9, lines 121 to 124, strike out the formula for "Thioacetyldisulphide" and insert instead

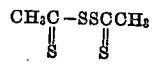

page 10, line 86, for the word "diphenyldine-" read *diphenyldime-;* page 15, claim 62, in the formula below the double bond for the letter "s" read $x$; same page, claim 64, strike out the formula and insert instead $$\overset{OCSM}{\underset{X}{\|}}$$

and that the said Letters Patent should be read with these corrections therein that the same may conform to the record of the case in the Patent Office.

Signed and sealed this 24th day of July, A. D. 1928.

[SEAL.]

WM. A. KINNAN,
*Acting Commissioner of Patents.*